(12) United States Patent
Hagiwara et al.

(10) Patent No.: US 8,693,168 B1
(45) Date of Patent: Apr. 8, 2014

(54) ELECTROCHEMICAL CAPACITOR

(71) Applicant: Taiyo Yuden Co., Ltd., Tokyo (JP)

(72) Inventors: Naoto Hagiwara, Tokyo (JP); Katsuei Ishida, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 14/053,760

(22) Filed: Oct. 15, 2013

(30) Foreign Application Priority Data

Oct. 16, 2012 (JP) .................................. 2012-228546
Oct. 30, 2012 (JP) .................................. 2012-238464

(51) Int. Cl.
 *H01G 4/228* (2006.01)
 *H01G 11/28* (2013.01)
 *H01G 11/24* (2013.01)
 *H01G 11/32* (2013.01)
 *H01G 9/00* (2006.01)

(52) U.S. Cl.
 CPC .............. *H01G 11/28* (2013.01); *H01G 11/24* (2013.01); *H01G 11/32* (2013.01); *H01G 9/155* (2013.01)
 USPC ........... 361/520; 361/502; 361/504; 361/509; 361/512; 361/519

(58) Field of Classification Search
 CPC ....... H01G 11/32; H01G 11/24; H01G 11/28; H01G 9/155; H01G 9/058
 USPC .................. 361/502, 503, 504, 509–512, 520, 361/527–529
 See application file for complete search history.

(56) References Cited

U.S. PATENT DOCUMENTS

| | | | | |
|---|---|---|---|---|
| 6,275,371 B1 * | 8/2001 | Yoshio et al. | ................. | 361/502 |
| 6,301,093 B1 * | 10/2001 | Noguchi et al. | ............. | 361/512 |
| 6,414,837 B1 * | 7/2002 | Sato et al. | ..................... | 361/504 |
| 6,426,865 B2 * | 7/2002 | Kasahara et al. | ............. | 361/512 |
| 6,493,209 B1 * | 12/2002 | Kamath et al. | ................ | 361/502 |
| 7,303,974 B2 * | 12/2007 | Hinoki et al. | ................. | 438/409 |

FOREIGN PATENT DOCUMENTS

| | | |
|---|---|---|
| JP | 2005-158700 A | 6/2005 |
| JP | 2007-005278 A | 1/2007 |
| JP | 2009-267572 A | 11/2009 |
| JP | 4591931 B2 | 9/2010 |
| JP | 4817778 B2 | 9/2011 |

OTHER PUBLICATIONS

Office Action issued in counterpart Japanese Application No. 2012-238464 dated Nov. 22, 2013 and English translation of the same (6 pages).
Decision to Grant a Patent issued in counterpart Japanese Application No. 2012-238464 dated Jan. 11, 2013 and English translation of the same (3 pages).

* cited by examiner

*Primary Examiner* — Nguyen T Ha
(74) *Attorney, Agent, or Firm* — Fitch, Even, Tabin & Flannery, LLP

(57) ABSTRACT

There is provided an electrochemical capacitor including a lid; a case having a via, and forming a liquid chamber together with the lid; an electric storage element housed in the liquid chamber; an electrolyte housed in the liquid chamber; a wiring having a via part arranged within the via, and connecting an inside to an outside of the liquid chamber; an extraction electrode connected to the via part; an overcoating layer for coating the extraction electrode, and having an opening to expose a partial region of the extraction electrode; and a conductive adhesive layer for fixing the electric storage element to the overcoating layer, and electrically connecting the electric storage element to the extraction electrode through the opening.

12 Claims, 12 Drawing Sheets

ELECTROCHEMICAL CAPACITOR

CROSS-REFERENCE TO RELATED APPLICATIONS

This application claims priority under 35 U.S.C. §119 to Japanese Patent Application No. JP2012-228546, filed on Oct. 16, 2012, and Japanese Application No. 2012-238464, filed on Oct. 30, 2012, the entire content of which are hereby incorporated herein by reference in their entirety.

FIELD

The present disclosure relates to an electrochemical capacitor including a chargeable and dischargeable electric storage element.

BACKGROUND

An electrochemical capacitor including a chargeable and dischargeable electric storage element is widely used as a back-up power supply etc. In general, the electrochemical capacitor has a structure that an electric storage element and an electrolyte are enclosed in an insulating case. The insulating case has wirings that electrically connect the electric storage element enclosed to an outside of the case. The electrochemical capacitor requires that the wirings are protected from electrolytic corrosion accompanied by charge and discharge of the electric storage element.

For example, in an electrochemical capacitor described in Japanese Patent No. 4591931 (paragraph [0047], FIG. 1), a pair of electrodes (electric storage elements) and an electrolyte are housed in a concave shaped case, internal terminals are disposed within the concave shaped case, and a protective film having conductivity is formed between the electric storage elements and the internal terminals.

In a cell described in Japanese Patent No. 4817778 (paragraph [0041], FIG. 5), electric storage elements and an electrolyte are housed in a case, and a resin layer containing conductive particles is formed between the electric storage elements and a second metallization layer (a layer for conducting the electric storage elements and an outside of the case).

In any of the electrochemical devices described in Japanese Patent No. 4591931 and Japanese Patent No. 4817778, a layer (a film) for preventing a contact of the electrolyte and the wirings is disposed in order to prevent the electrolytic corrosion of the wirings by the electrolyte.

SUMMARY

However, in the electrochemical capacitors described in Japanese Patent No. 4591931 and Japanese Patent No. 4817778, the electrolyte may be intruded between the case and the layer for preventing the contact of the electrolyte and the wirings to induce corrosion to the wirings because of age-related degradation, degradation accompanied by the charge and discharge of the electric storage elements, or the like. Once the corrosion is induced, the conductive properties between the wirings and the electric storage elements may be decreased to induce an open failure. Alternatively, wiring metal ions dissolved by the corrosion are precipitated at a negative electrode to be a leak current. Finally, a short circuit failure may be induced by migration.

In view of the above-mentioned circumstances, it is desirable to provide an electrochemical capacitor that can adequately protect wirings for electrically connecting an electric storage element to an outside of a case from electrolytic corrosion.

According to an embodiment of the present disclosure, there is provided an electrochemical capacitor including a lid; a case; an electric storage element; an electrolyte; a wiring; an extraction electrode; an overcoating layer; and a conductive adhesive layer.

The case has a via, and forms a liquid chamber together with the lid.

The electric storage element is housed in the liquid chamber.

The electrolyte is housed in the liquid chamber.

The wiring has a via part arranged within the via, and connects an inside to an outside of the liquid chamber.

The extraction electrode is connected to the via part.

The overcoating layer is to coat the extraction electrode, and has an opening to expose a partial region of the extraction electrode.

The conductive adhesive layer fixes the electric storage element to the overcoating layer, and electrically connects the electric storage element to the extraction electrode through the opening.

According to an embodiment of the present disclosure, there is provided an electrochemical capacitor including a case; an electric storage element; an electrolyte; a wiring; an extraction electrode; and a conductive adhesive layer.

The case forms a liquid chamber, has a via, and an overcoating part to coat the extraction electrode having an opening to expose a partial region of the extraction electrode.

The electric storage element is housed in the liquid chamber.

The electrolyte is housed in the liquid chamber.

The wiring has a via part arranged within the via, and connects an inside to an outside of the liquid chamber.

The extraction electrode is connected to the via part.

The conductive adhesive layer fixes the electric storage element to the overcoating part, and electrically connects the electric storage element to the extraction electrode through the opening.

These and other objects, features and advantages of the present disclosure will become more apparent in light of the following detailed description of best mode embodiments thereof, as illustrated in the accompanying drawings.

DETAILED DESCRIPTION OF PREFERRED EMBODIMENTS

Figure 1:
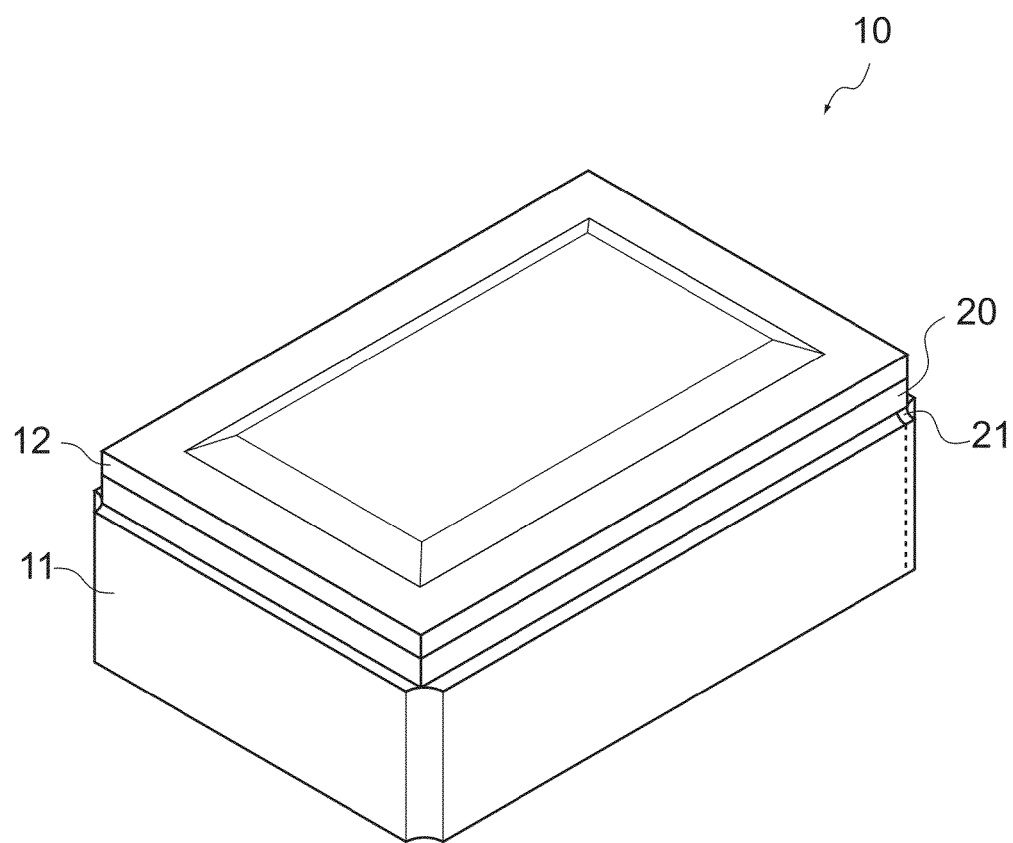
FIG. 1 is a perspective view of an electrochemical capacitor according to an embodiment of the present disclosure.

According to an embodiment of the present disclosure, there is provided an electrochemical capacitor including a lid; a case; an electric storage element; an electrolyte; a wiring; an extraction electrode; an overcoating layer; and a conductive adhesive layer.

The case has a via, and forms a liquid chamber together with the lid.

The electric storage element is housed in the liquid chamber.

The electrolyte is housed in the liquid chamber.

The wiring has a via part arranged within the via, and connects an inside to an outside of the liquid chamber.

The extraction electrode is connected to the via part.

The overcoating layer is to coat the extraction electrode, and has an opening to expose a partial region of the extraction electrode.

The conductive adhesive layer fixes the electric storage element to the overcoating layer, and electrically connects the electric storage element to the extraction electrode through the opening.

The electrochemical capacitor has a configuration that in the liquid chamber in which the electric storage element is housed, the extraction electrode is extracted from the via part of the wiring for electrically connecting the electric storage element to the outside of the liquid chamber. The via part and the extraction electrode are coated with the overcoating layer, the partial region of the extraction electrode is exposed from the opening disposed at the overcoating layer, and extraction electrode and the conductive adhesive layer are electrically connected. By electrically connecting the wiring (the via part) to the conductive adhesive layer through the extraction electrode, it is possible to dispose a connection surface with the conductive adhesive layer on the extraction electrode that can be formed flat. In this way, a plating can be formed at a uniform thickness on the connection surface with the conductive adhesive layer of the extraction electrode. In general, the electrolyte housed in the liquid chamber may intrude to an adhesion surface of the conductive adhesive layer to cause the electrolytic corrosion. However, when the plating is formed uniformly, the electrolyte prevents the electrolytic corrosion of the via part. Thus, the performance of the electrochemical capacitor (including the open failure) can be prevented from degrading.

The extraction electrode may have a base region connected to the via part, and a plurality of branched regions that are formed by branching from the base region and are apart from each other.

The overcoating layer may have a plurality of openings corresponding to a plurality of the branched regions.

By this configuration, as a plurality of the branched regions are connected to the conductive adhesive layer through the openings of the overcoating layer, even if the electrolytic corrosion is induced in one branch region, it is possible to ensure the electrical connection between the extraction electrode and the conductive adhesive by other branched region.

The case may have a plurality of the vias. The wiring may have a plurality of the via parts disposed within a plurality of the vias. There may be a plurality of the extraction electrodes, which may be connected to a plurality of the via parts and be apart from each other.

By this configuration, as a plurality of the extraction electrodes is independent each other, even if the electrolytic corrosion reaches the via part of one extraction electrode, it is possible to ensure the electrical connection between the wiring and the conductive adhesive by other extraction electrode.

The case may have three or more of the vias formed such that they are not arranged on the same straight line.

When the vias formed in the case are arranged on the same straight line, the case may have lower strength on the straight line, and cracks etc. may be easily generated based on the vias. Therefore, when three or more of the vias are formed, they are not arranged on the same straight line, whereby the strength of the case can be prevented from decreasing.

The overcoating layer may have the opening disposed near a center of the electric storage element than the via part.

As described above, the extraction electrode and the conductive adhesive are connected through the opening of the overcoating layer. When the opening is disposed near the center of the electric storage element, an electrical connection between the electric storage element and the extraction electrode becomes better. On the other hand, as the via part is electrically connected to the electric storage element through the extraction electrode, there is no need to dispose the via part near the center of the electric storage element, and it is desirable that the via part be apart from the opening of the overcoating layer so that a length of the extraction electrode can be ensured. The longer extraction electrode can retard an arrival of the electrolytic corrosion to the via part. In other words, it is desirable that the opening of the overcoating layer be closer to the center of the electric storage element, and the via part be apart from the center of the electric storage element. By utilizing the extraction electrode, such a configuration can be realized.

The case may be made of HTCC (High Temperature Co-fired Ceramics) or LTCC (Low Temperature Co-fired Ceramics). The overcoating layer may be made of the same material as the case.

When the case is made of HTCC or LTCC, the wirings etc. can be disposed within the case, which is desirable in terms of the production process. When the overcoating layer is made of the same material as the case, it is possible to fire the case and the overcoating layer at the same firing step. There is no need to conduct another step to dispose the overcoating layer, and it is possible to ensure bond strength, adhesion etc. of the overcoating layer against the case.

According to another embodiment of the present disclosure, there is provided an electrochemical capacitor including a lid; a case; an electric storage element; an electrolyte; a wiring; an extraction electrode; and a conductive adhesive layer.

The case has a via, forms the liquid chamber, and an overcoating part to coat the extraction electrode having an opening to expose a partial region of the extraction electrode.

The electric storage element is housed in the liquid chamber.

The electrolyte is housed in the liquid chamber.

The wiring has a via part arranged within the via, and connects an inside to an outside of the liquid chamber.

The extraction electrode is connected to the via part.

The conductive adhesive layer fixes the electric storage element to the overcoating part, and electrically connects the electric storage element to the extraction electrode through the opening.

The electrochemical capacitor has a configuration that, in the liquid chamber in which the electric storage element is housed, the extraction electrode is extracted from the via part of the wiring that electrically connects the electric storage element and the outside of the liquid chamber. The via part and the extraction electrode are coated with the overcoating part. The partial region of the extraction electrode is exposed from the opening disposed at the overcoating part, and the extraction electrode and the conductive adhesive layer are electrically connected. By electrically connecting the wiring (the via part) and the conductive adhesive layer through the extraction electrode, it will be possible to dispose the connection surface with the conductive adhesive layer on the extraction electrode that can be formed flat. In this way, a plating can be formed at a uniform thickness on the connection surface with the conductive adhesive layer of the extraction electrode. In general, the electrolyte housed in the liquid chamber may intrude to an adhesion surface of the conductive adhesive layer to cause the electrolytic corrosion. However, when the plating is formed uniformly, the electrolyte prevents the electrolytic corrosion of the via part. Thus, the performance of the electrochemical capacitor (including the open failure) can be prevented from degrading.

The extraction electrode may have a base region connected to the via part, and a plurality of the branched regions that are formed by branching from the base region and are apart from each other.

The overcoating parts may have a plurality of openings corresponding to a plurality of the branched regions.

The case may have a plurality of the vias. The wiring may have a plurality of the via parts disposed within a plurality of the vias. There may be a plurality of the extraction electrodes, which may be connected to a plurality of the via parts and be apart from each other.

The case may have three or more of the vias formed such that they are not arranged on the same straight line.

The overcoating part may have the opening disposed near a center of the electric storage element than the via part.

The case may be made of HTCC (High Temperature Co-fired Ceramics) or LTCC (Low Temperature Co-fired Ceramics). The overcoating part may be made of the same material as the case.

Hereinafter, embodiments of the present disclosure will be described with reference to the drawings.

[Electrochemical Capacitor Configuration]

Figure 2:
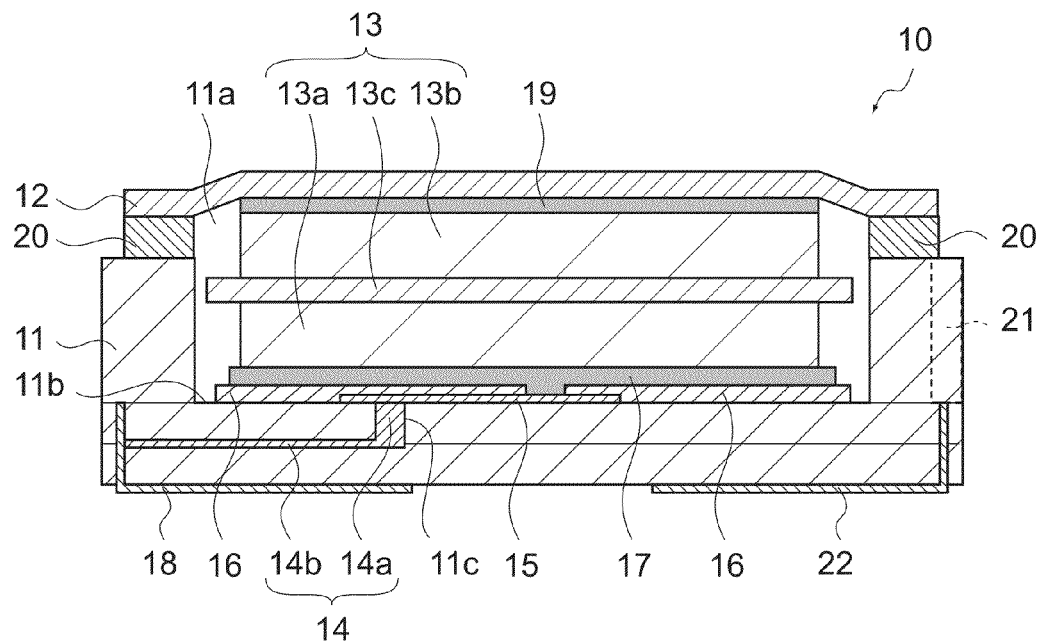
FIG. 2 is a cross-sectional view of the electrochemical capacitor.
Figure 3:
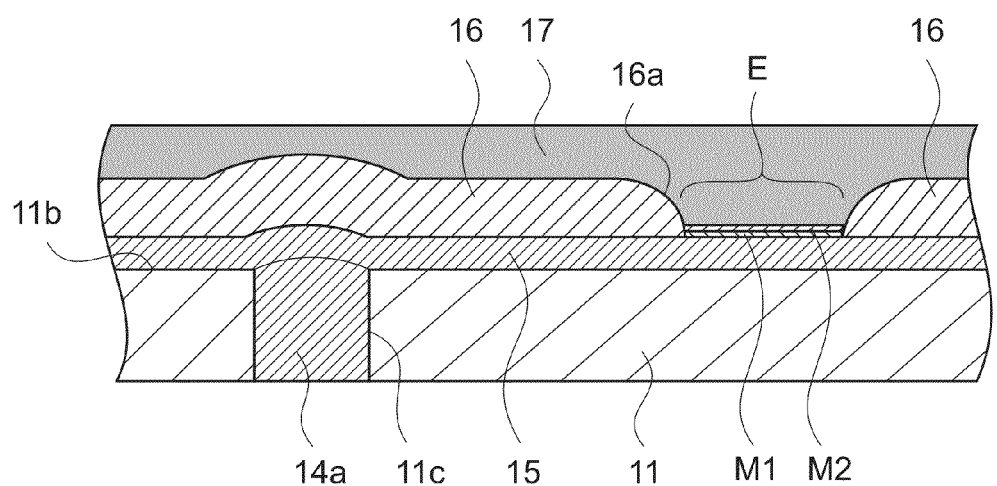
FIG. 3 is an enlarged cross-sectional view of the electrochemical capacitor.

FIG. 1 is a perspective view showing an appearance of an electrochemical capacitor 10 according to an embodiment of the present disclosure. FIG. 2 is a cross-sectional view of the electrochemical capacitor 10. FIG. 3 is an enlarged view showing a part of the cross-sectional view shown in FIG. 2. As shown in these figures, the electrochemical capacitor 10 includes a case 11, a lid 12, an electric storage element 13, positive electrode wirings 14, an extraction electrode 15, an overcoating layer 16, a positive electrode adhesive layer 17, a positive electrode terminal 18, a negative adhesive layer 19, a seal ring 20, a negative electrode wiring 21 and a negative electrode terminal 22.

As shown in FIG. 2, in the electrochemical capacitor 10, the case 11 is bonded to the lid 12 through the seal ring 20, thereby forming a liquid chamber 11a. In the liquid chamber 11a, the electric storage element 13 and an electrolyte are enclosed.

The case 11 is made of an insulation material, and forms the liquid chamber 11a together with the lid 12. The case 11 may be formed in a concave shape to configure the liquid chamber 11a. For example, the case 11 may also have other shapes such as a cuboid shape as shown in FIG. 1, a cylindroid shape and the like. Hereinafter, a bottom of the liquid chamber 11a in the case 11 refers to a bottom 11b. In the bottom 11b, a via 11c communicating with the bottom 11b is formed. The via 11c may be formed halfway to the case 11, or may be formed through to a rear of the case 11.

The case 11 may be made of HTCC (High Temperature Co-fired Ceramics) or LTCC (Low Temperature Co-fired Ceramics), but is not especially limited thereto. In an HTCC process or an LTCC process, it is possible to dispose the positive electrode wirings 14 etc. inside of the case 11, resulting in excellent production efficiency.

The lid 12 is bonded to the case 11 through the seal ring 20, and seals the liquid chamber 11a. The lid 12 can be made of any conductive material, and can be for example made of Kovar (an iron-nickel-cobalt alloy). Also, the lid 12 can also be a clad material provided by coating a base material such as Kovar with a coated film made of a metal having high corrosion resistance such as nickel, platinum, silver, gold and palladium in order to prevent electrolytic corrosion.

After the electric storage element 13 is disposed inside of the liquid chamber 11a, the lid 12 is bonded to the case 11 through the seal ring 20 and seals the liquid chamber 11a. For binding the lid 12 to the seal ring 20, a direct bonding method by a seam welding, a laser welding or the like as well as an indirect bonding method using a conductive bond material can be utilized.

The electric storage element 13 is housed in the liquid chamber 11a, and accumulates (charges) or emits (discharges) electric charges. As shown in FIG. 2, the electric storage element 13 has a positive electrode sheet 13a, a negative electrode sheet 13b and a separate sheet 13c, and has a configuration that the separate sheet 13c is sandwiched between the positive electrode sheet 13a and the negative electrode sheet 13b.

The positive electrode sheet 13a contains an active substance. The active substance adsorbs electrolyte ions (for example, $BF_4$) on the surface to form an electric double layer, and is active carbon or PAS (polyacenic organic semiconductor), for example. The positive electrode sheet 13a can be provided by rolling a mixture of the active substance, a conductive aid (for example, Ketchen black) and a binder (for example, PTFE (polyetetrafluoroethylene)) to form a sheet, and cutting it.

The negative electrode sheet 13b contains the active substance similar to the positive electrode sheet 13a, and can be provided by rolling a mixture of the active substance, the conductive aid and the binder to form a sheet, and cutting it. The negative electrode sheet 13b can be made of the same or different material as/from the positive electrode sheet 13a.

The separate sheet 13c electrically insulates the electrodes each other. The separate sheet 13c can be a porous sheet containing glass fiber, cellulose fiber, plastic fiber.

The electrolyte housed in the liquid chamber 11a together with the electric storage element 13 can be selected freely, and can include anions such as $BF_4^-$ (tetrafluoroboric acid ions), $PF_6^-$ (hexafluorophosphoric ion) and $(CF_3SO_2)_2N^-$ (TFSA ions). Specifically, a solution of 5-azobispyro[4.4]nonane-$BF_4$ or ethylmethylimidazoliumnonane-$BF_4$ can be used.

The positive electrode wirings 14 electrically connect the positive electrode sheet 13a of the electric storage element 13 and the positive electrode terminal 18 through the positive electrode adhesive layer 17 and the extraction electrode 15. Specifically, the positive electrode wirings 14 includes a via part 14a disposed within the via 11c, and a band part 14b connected to the positive electrode terminal 18 through the inside of the case 11. When the via 11c is formed passing completely through the case 11, the positive electrode wirings 14 can be configured only of the via part 14a.

The positive electrode wirings 14 can be made of any conductive material. Although the details will be described later, as the via part 14a is protected from the electrolytic corrosion by a contact with the electrolyte, it is possible to select the positive electrode wirings 14 from a wide variety of materials irrespective of corrosion resistance. The via part 14a can be made of tungsten having high melting point, for example. FIG. 3 shows that the extraction electrode 15 is curved directly above the via part 14a. This shows that a constituent material of the case 11 is contracted in a firing process of the case 11 (such as HTCC process or LTCC process) and that a material of the via part 14a is pushed.

The extraction electrode 15 is connected to the via part 14a of the positive electrode wirings 14, is connected to the positive electrode sheet 13a of the electric storage element 13 through the positive electrode adhesive layer 17, and electrically connects therebetween.

Figure 4A:
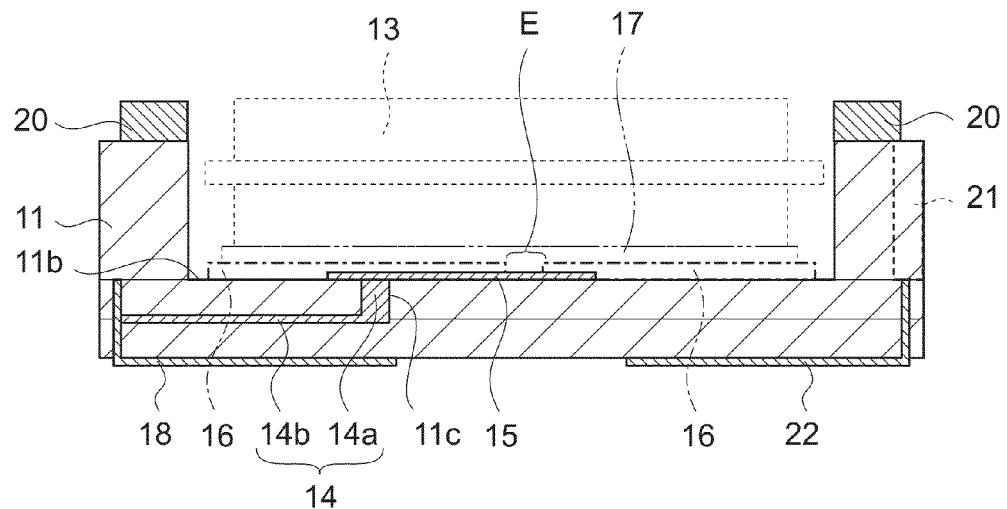
FIGS. 4A and 4B each is a schematic view showing an extraction electrode of the electrochemical capacitor.
Figure 4B:
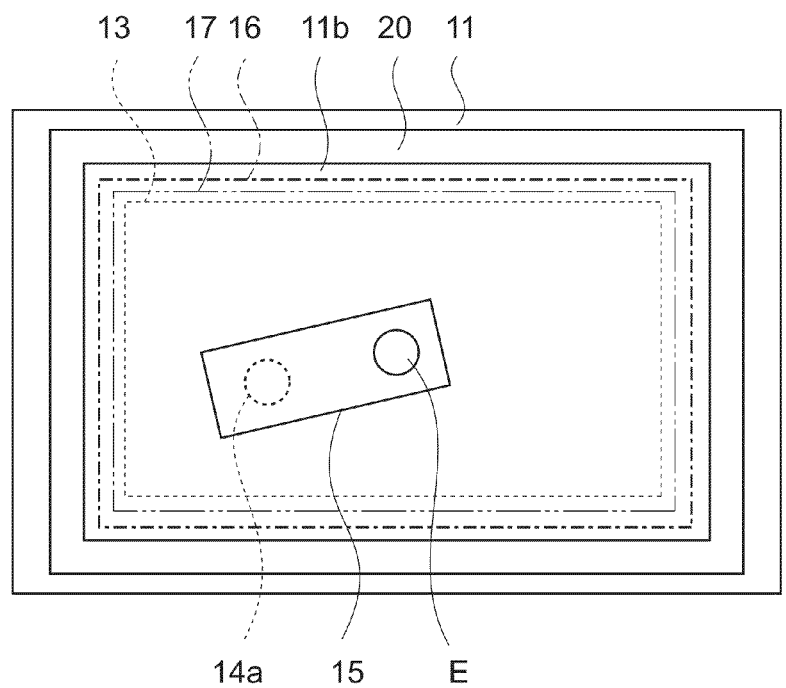

FIGS. 4A and 4B each is a schematic view showing a placement of the extraction electrode 15, and shows a part configuration of the electrochemical capacitor 10. FIG. 4A is a sectional view of the configuration. FIG. 4B is a plan view, viewed from the above (a direction facing to the bottom 11b).

As shown in FIGS. 4A and 4B, the extraction electrode 15 is disposed on the bottom 11b of the case 11, and is formed at least from directly above the via part 14a to directly under the electric storage element 13 and the positive electrode adhesive layer 17. This is because the extraction electrode 15 is required to be connected to the via part 14a as well as to the positive electrode adhesive layer 17 through the opening (described later) of the overcoating layer 16.

The extraction electrode 15 may be made of any conductive material, and can be made of the same or different material as/from the positive wirings 14. As shown in FIG. 3, an exposed region of the extraction electrode 15 at the opening of the overcoating layer 16 is plated to protect the conductive material of the extraction electrode 15. FIG. 3 shows a first plated layer M1 formed on the surface of the extraction electrode 15, and a second plated layer M2 on the first plated layer M1 (not shown in FIG. 2). For example, the first plated layer M1 is composed of nickel, and the second plated layer M2 is composed of gold. The number and the material of the plated layer are not limited thereto, and can be changed depending on the electrolyte and the material of the extraction electrode 15 as appropriate. In addition, a protective layer may be disposed on the plated layer to protect the plated layer. The protective layer can be a metal layer made of aluminum, gold, platinum, stainless steel (SUS316L, SUS316 etc.).

As shown in FIGS. 2 and 3, the overcoating layer 16 coats the extraction electrode 15, and protects the extraction electrode 15 from the electrolytic corrosion. The overcoating layer 16 can be made of an insulation material that is not corroded by the electrolyte. In particular, the overcoating layer 16 is desirably made of the same material as the case 11, when the case 11 is made of HTCC or LTCC. This is because the case 11 and the overcoating layer 16 can be formed by the same firing process (HTCC process or LTCC process).

As shown in FIG. 3, the overcoating layer 16 has an opening 16a. The opening 16a is formed at a region of the overcoating layer 16 where the positive electrode adhesive layer 17 is disposed as an upper layer and the extraction electrode 15 is disposed as a lower layer. By the opening 16a, the partial region of the extraction electrode 15 is exposed from the overcoating layer 16. The exposed region is connected to the positive electrode adhesive layer 17. In other words, by the opening 16a, an electrical connection is formed between the positive electrode adhesive layer 17 (conductive) and the extraction electrode 15. As described above, the plated layers (the first plated layer M1 and the second plated layer M2) can be formed at the region of the extraction electrode 15 exposed from the opening 16a. In this case, the positive electrode adhesive layer 17 is connected to the extraction electrode 15 through the plated layers.

In the following description, the partial region of the extraction electrode 15 that is connected to the positive electrode adhesive layer 17 by the opening 16a refers to a "power collector E". The power collector E is desirably disposed adjacent to the center of the electric storage element 13 in terms of a positional relationship with the via part 14a. The closer the power collector E disposed at the center of the positive electrode sheet 13a is, the better the electrical connection between the power collector E and the positive electrode sheet 13a. On the other hand, the more the via part 14a apart from the power collector E is, the less the via part 14a susceptible to the electrolytic corrosion is (as described later).

The positive electrode adhesive layer 17 adheres the case 11 to the positive electrode sheet 13a, and electrically connects the positive electrode sheet 13a to the extraction electrode 15. As shown in FIG. 2, the positive adhesive layer 17 is disposed on the overcoating layer 16, and is connected to the extraction electrode 15 through the opening 16a formed on the overcoating layer 16 as described above. Since the positive adhesive layer 17 is for adhesion and electrical connection to the electric storage element 13, the positive adhesive layer 17 is desirably formed over an entire region of the electric storage element 13 (the positive electrode sheet 13a).

The positive electrode layer 17 can be provided by coating and curing the conductive adhesive material on the overcoating layer 16. The conductive adhesive material can be a synthetic resin containing the conductive particles. The conductive particles desirably have a high chemical stability. For example, graphite particles can be used. The synthetic resin desirably has low swellability to the electrolyte, high heat resistance, and high chemical stability. For example, a phenol resin can be used.

The positive electrode terminal 18 is disposed outside of the electrochemical capacitor 10, is connected to the positive electrode wirings 14, and is connected to the positive electrode (the positive electrode sheet 13a) of the electric storage element 13 through the positive electrode wirings 14, the extraction electrode 15 and the positive adhesive layer 17. The positive electrode terminal 18 is used for a connection between the electrochemical capacitor 10 and an outside of the electrochemical capacitor 10, for example, a mounting substrate. The positive electrode terminal 18 can be made of any conductive material, and may have a non-limiting position or shape.

The negative adhesive layer 19 fixes the negative electrode sheet 13b to the lid 12, and electrically connects the negative electrode sheet 13b to the lid 12. The negative adhesive layer 19 is provided by curing the conductive adhesive material. Similar to the case of the positive adhesive layer 17, the conductive adhesive material can be the synthetic resin containing the conductive particles. The negative electrode adhesive layer 19 and the positive electrode adhesive layer 17 may be made of the same type of the conductive adhesive material or the other types of the conductive adhesive materials.

The seal ring 20 connects the case 11 to the lid 12, seals the liquid chamber 11a, and electrically connects the lid 12 to the negative electrode wiring 21. The seal ring 20 can be made of the conductive material such as Kovar (an iron-nickel-cobalt alloy). In addition, on the surface of the seal ring 20, a corrosion resistant film (for example, a nickel film, a gold film etc.) can be formed. The seal ring 20 can be disposed at the case 11 and the lid 12 by brazing, for example. Alternatively, the seal ring 20 can be disposed on the case 11 by printing the conductive material.

The negative electrode wiring 21 electrically connects the negative electrode sheet 13b to the negative electrode terminal 22 through the negative electrode adhesive layer 19, the lid 12 and the seal ring 20. Specifically, the negative electrode wiring 21 is formed from the seal ring 20 along an outer perimeter of the case 11, and can be connected to the negative electrode terminal 22. The negative electrode wiring 21 can be made of any conductive material, and may have a non-limiting position or shape.

The negative electrode terminal 22 is disposed outside of the electrochemical capacitor 10, is connected to the negative electrode wiring 21, and is connected to the negative electrode (the negative electrode sheet 13b) of the electric storage element 13 through the negative electrode wiring 21, the seal ring 20, the lid 12 and the negative adhesive layer 19. The negative electrode terminal 22 is used for a connection between the electrochemical capacitor 10 and an outside of the electrochemical capacitor 10, e.g., a mounting substrate, similar to the positive electrode terminal 18. The negative electrode terminal 22 can be made of any conductive material, and may have a non-limiting position or shape.

The electrochemical capacitor 10 according to the embodiment has the above-described configuration.

[Effect of Electrochemical Capacitor]

As the effect of the electrochemical capacitor 10 is described, the electrochemical capacitor 10 is compared with a comparative electrochemical capacitor.

Figure 5A:
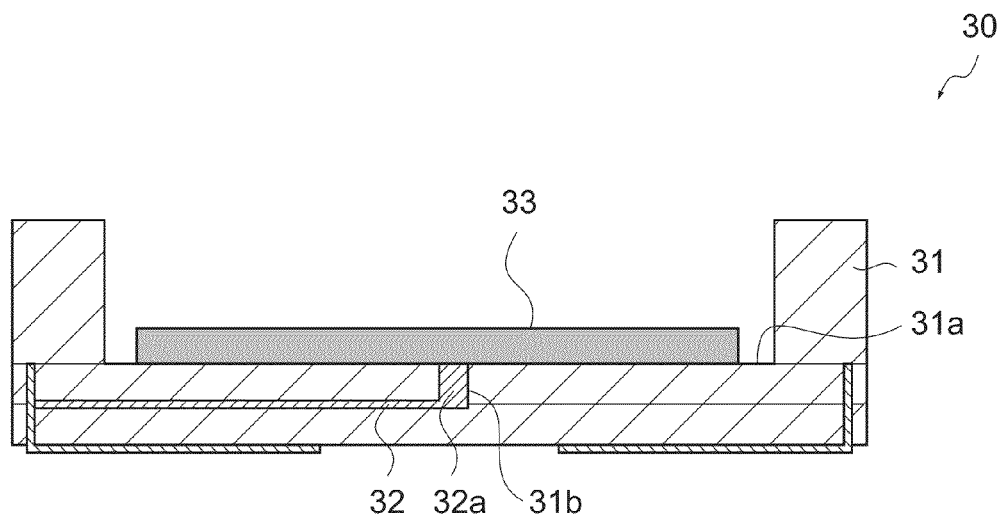
FIGS. 5A and 5B each is a schematic view of an electrochemical capacitor according to comparative embodiment.
Figure 5B:
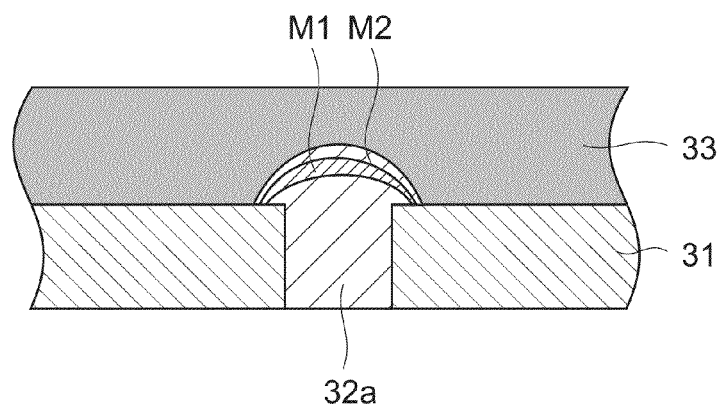

FIGS. 5A and 5B each is a schematic view showing an electrochemical capacitor according to comparative embodiment. FIG. 5A is a cross-sectional view of an electrochemical capacitor 30. FIG. 5B is an enlarged view of FIG. 5A. Although not shown, the electrochemical capacitor 30 includes the electric storage element, the lid etc. similar to those used in the electrochemical capacitor 10 according to the embodiment.

As shown in FIG. 5A, the electrochemical capacitor 30 has a via 31b at a bottom 31a of a case 31. A wiring 32 has a via part 32a disposed within the via 31b. At the bottom 31a, a positive electrode adhesive layer 33 is formed. Thus, the positive electrode adhesive layer 33 is formed directly above the via part 32a. Although the via part 32a is coated with the positive electrode adhesive layer 33, the electrolyte may be intruded from an interface between the positive electrode layer 33 and the case 31, so that the via part 32a should be protected from the electrolytic corrosion.

As shown in FIG. 5B, an upper end of the via part 32a has a curved convex shape. When the case 31 is fired, ceramics are contracted and metal of the via part 32a is pushed, thereby forming the curved convex shape. When plated layers (a first plated layer M1 and a second plated layer M2) are formed on the via part 32a in order to protect the via part 32a from the electrolytic corrosion, a growth rate of the plating becomes slower at the outer perimeter of the via part 32a, i.e., the thickness of the plated layer at the outer perimeter becomes thin.

The reason is that a current less flows at the outer perimeter of the via part 32a, when electrolytic plating is performed. Also in the case of electroless plating, the outer perimeter of the via part 32a is distant from a supply source of ions or a reducing agent, and the growth rate of the plating becomes slower. As a result, the metal of the via part 32a is not sufficiently protected especially at the outer perimeter of the via part 32a, which may cause the electrolytic corrosion.

In contrast, the electrochemical capacitor 10 according to the embodiment (see FIG. 3) has the configuration that the extraction electrode 15 is connected to the via part 14a, and is connected to the positive electrode adhesive layer 17. The top of via part 14a is coated with the overcoating layer 16, and is not directly contacted with the positive electrode adhesive layer 17. Therefore, the via part 14a will be protected consistently, even when the constituent material of the via part 14a is pushed by the contraction of the case 11. In addition, the plated layers (the first plated layer M1 and the second plated layer M2) for protecting from the electrolytic corrosion can be formed on a flat surface of the extraction electrode 15. Dissimilar to comparative embodiment, the thickness of the plated layer is prevented from being non-uniform.

If the case 11 is not contracted and the constituent material of the via part 14a is not extruded, the via part 14a is well protected as compared with that in comparative embodiment, because the via part 14a is coated with the overcoating layer 16. In addition, in the electrochemical capacitor 10, the distance between the via part 14a and the power collector E is ensured by the extraction electrode 15 (see FIG. 4B). Even though the electrolytic corrosion is induced at the power collector E, the time to reach the effect to the via part 14a is gained. In other words, the electrochemical capacitor 10 has a longer usable life after the electrolytic corrosion occurs as compared with comparative embodiment.

[Method of Forming Electrochemical Capacitor]

A method of forming the electrochemical capacitor 10 will be described. FIGS. 6 to 8 are schematic diagrams showing a method of forming the capacitor 10. In the following description, the method of forming the case 11 is described based on the HTCC process or the LTCC process. However, the method of forming the electrochemical capacitor 10 is not limited thereto.

Figure 6A:
FIGS. 6A to 6C each is a schematic view showing a method of forming the electrochemical capacitor according to the embodiment of the present disclosure.

The ceramics material is compounded to form a ceramics plate 41 using a mold etc. as shown in FIG. 6A. In the ceramics plate 41, a via 11c is formed. The via 11c may be formed together with the formation of the first ceramics plate 41, or may be formed using a laser after the formation.

Figure 6B:
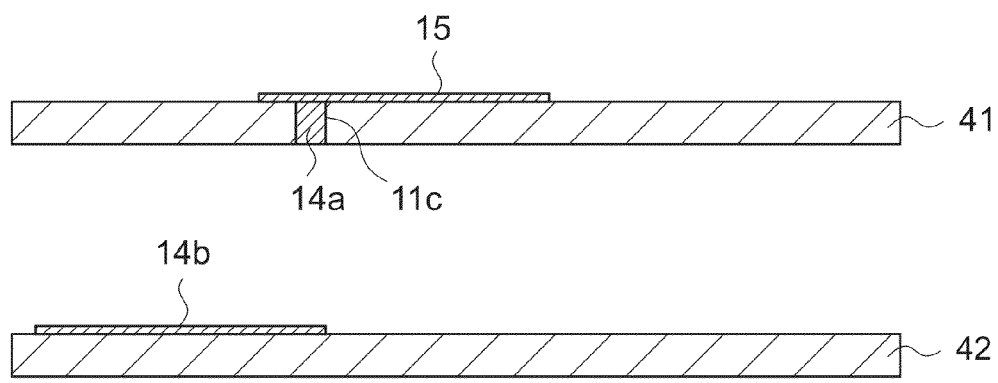

Then, as shown in FIG. 6B, the via part 14a and the extraction electrode 15 are formed in/on the ceramics plate 41. The via part 14a and the extraction electrode 15 may be formed at the same time, or may be formed separately. As shown in FIG. 6B, the band part 14b of the positive electrode wirings 14 is formed on another ceramics plate 42.

The via part 14a, the band part 14b and the extraction electrode 15 can be formed by printing a tungsten paste on each ceramics plate in the HTCC process, or by printing a silver paste or a copper paste on each ceramics plate in the LTCC process. In the LTCC process, the seal ring 20 (not shown) can also be formed by printing.

Figure 6C:
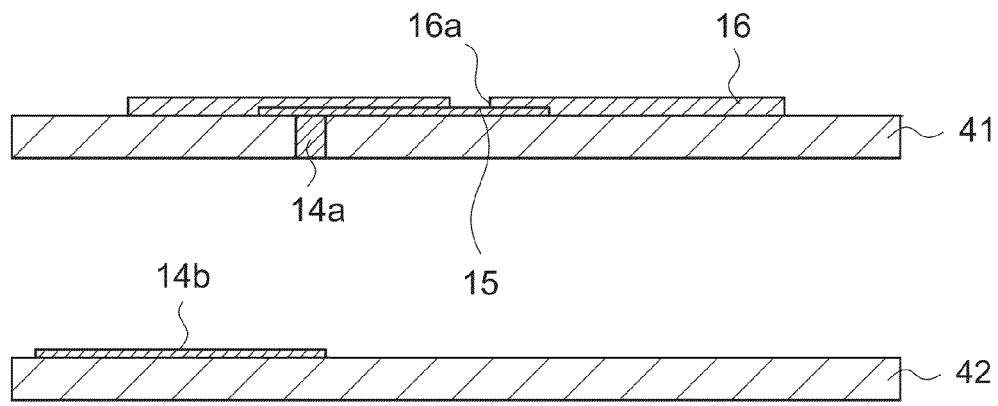

Then, as shown in FIG. 6C, the overcoating layer 16 is disposed to coat the extraction electrode 15 on the ceramics plate 41. The overcoating layer 16 can be disposed by coating a paste ceramics material. In the overcoating layer 16, the opening 16a is formed for exposing the extraction electrode 15 as described above.

Figure 7A:
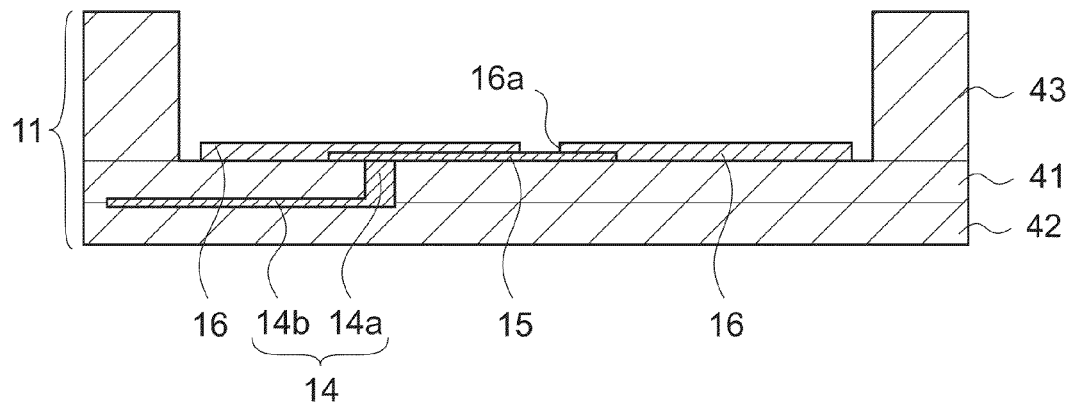
FIGS. 7A to 7C each is a schematic view showing a method of forming the electrochemical capacitor according to the embodiment of the present disclosure.
Figure 7B:
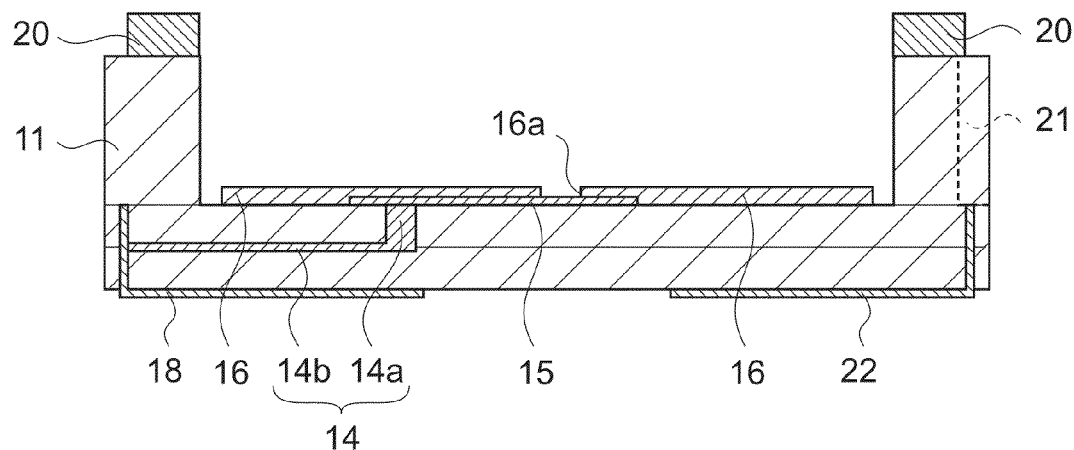

Then, as shown in FIG. 7A, the ceramics plate 41, the ceramics plate 42 and still another ceramics plate 43 are laminated. The ceramics plate 43 has a circular shape having the opening corresponding to the liquid chamber 11a.

Then, the laminate shown in FIG. 7A is fired by the HTCC process or the LTCC process. In the HTCC process, the laminate is heated, for example, to 1600° C., and in the LTCC process, the laminate is heated, for example, to 900° C. By this step, the case 11 and the overcoating layer 16 are fired. In this way, the case 11 and the overcoating layer 16 are fired in one firing step, and the extraction electrode 15 can be coated with the overcoating layer 16. Thus, the electrochemical capacitor 10 is produced with high efficiency. Since the overcoating layer 16 and the case 11 are fired at the same time, it is possible to increase the intensity and airtightness therebetween.

Then, the plated layers (the first plated layer M1 and the second plated layer M2 (see FIG. 3)) are formed at the extraction electrode 15 exposed from the opening 16a. As shown FIG. 7B, the positive electrode terminal 18, the negative electrode terminal 22, the negative electrode wiring 21 etc. are disposed in the case 11. These may be disposed at a later step. When the seal ring 20 is not formed in the above-described printing step, the seal ring 20 is disposed at the case 11 by brazing etc.

Figure 7C:
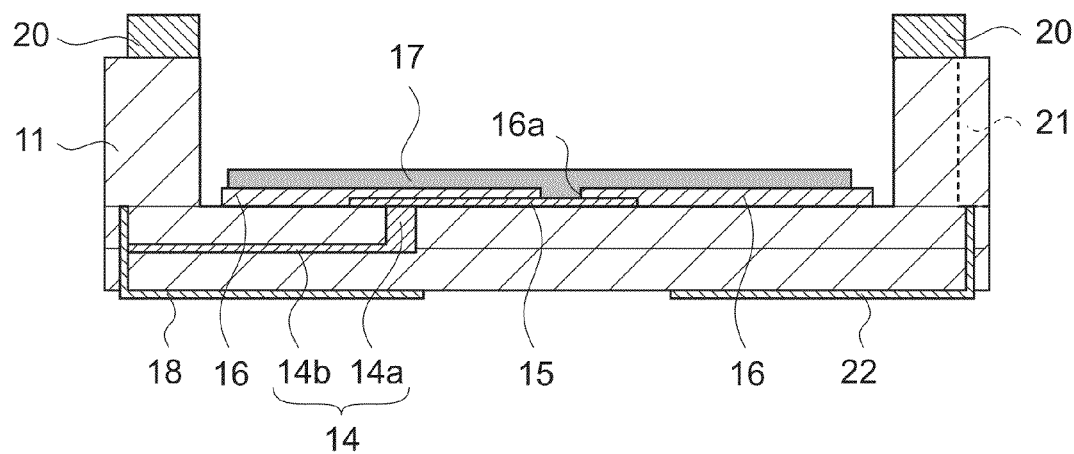

Then, as shown in FIG. 7C, the conducive adhesive that will become the positive electrode adhesive layer 17 on the overcoating layer 16. The conductive adhesive is coated and connected to the extraction electrode 15 exposed from the opening 16a with certainty.

Figure 8A:
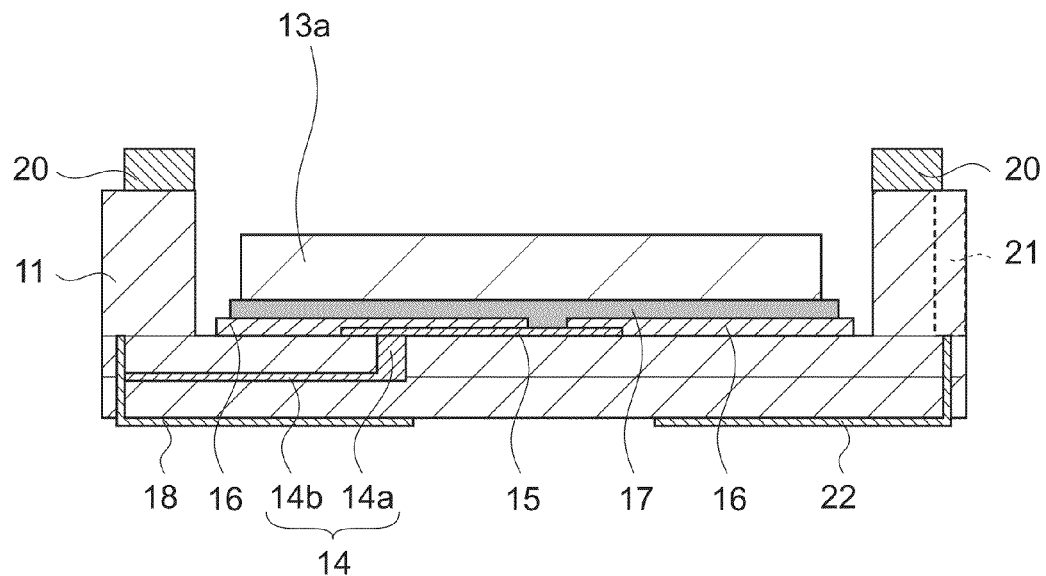
FIGS. 8A and 8B each is a schematic view showing a method of forming the electrochemical capacitor according to the embodiment of the present disclosure.
Figure 8B:
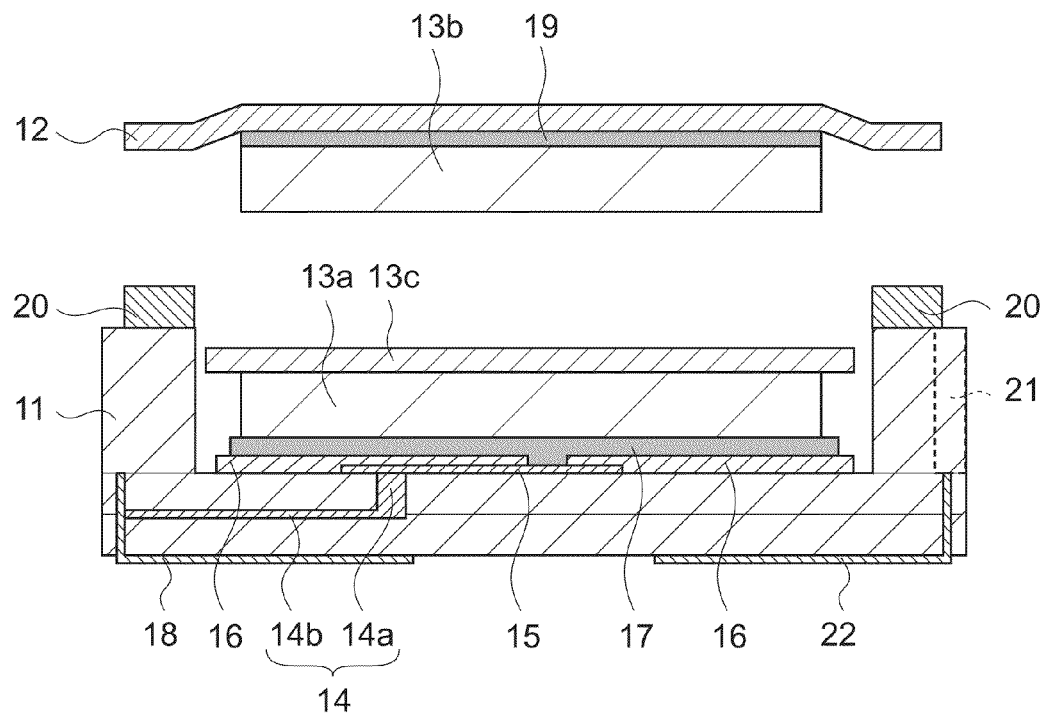

Then, as shown in FIG. 8A, the positive electrode sheet 13a is adhered to the positive electrode adhesive layer 17. As shown in FIG. 8B, the conductive adhesive that will become the negative electrode adhesive layer 19 is coated, and the negative electrode sheet 13b is adhered thereon.

As shown in FIG. 8B, the separate sheet 13c is placed on the positive electrode sheet 13a, and the electrolyte is injected. Also, the electrolyte is injected to the negative electrode sheet 13b. Then, the lid 12 is overlaid on the seal ring 20, and is bonded thereto by laser welding etc. In this way, the liquid chamber 11a is sealed, and the electrochemical capacitor 10 (see FIG. 2) is produced.

[Variations of Extraction Electrode]

In the above description, the extraction electrode 15 is connected to one via part 14a and has one power collector E (see FIG. 4B). However, it is not limited thereto. Hereinafter, variations of the extraction electrode 15 will be described. FIGS. 9 to 12 each shows a variation of the extraction electrode 15. In the following description, the configurations other than the extraction electrode 15, the via part 14a and the power collector E are the same as the above. In the case 11, each via 11c is formed corresponding to each via part 14a. Also, in the overcoating layer 16, each opening 16a is formed corresponding to each power collector E.

Figure 9:
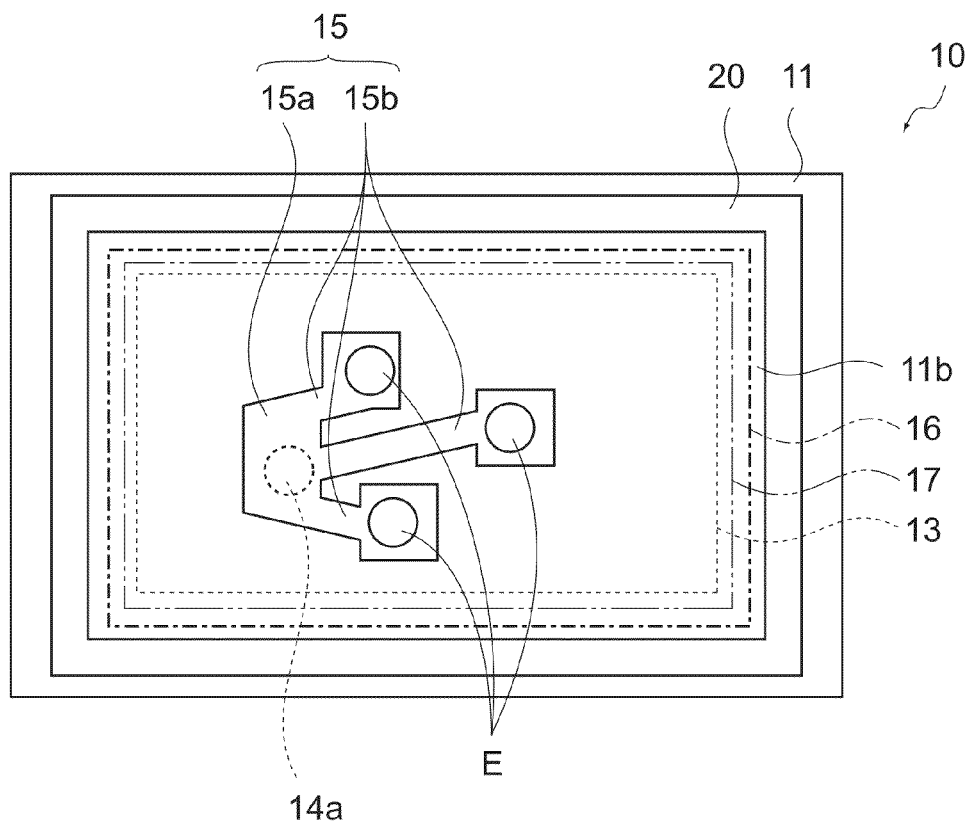
FIG. 9 is a schematic view showing a variation of the extraction electrode of the electrochemical capacitor according to the embodiment of the present disclosure.

FIG. 9 is a schematic view showing the electrochemical capacitor 10 including the extraction electrode 15 having a branch. As shown in FIG. 9, the extraction electrode 15 includes a base region 15a connected to the via part 14a, and a plurality of (three) branched regions 15b that are formed and branched from the base region 15a and are apart from each other. In each branched region 15b, one power collector E is formed. As shown in FIG. 9, it is desirable that each power collector E be disposed at the center of the electric storage element 13 rather than the via part 14a. Furthermore, the number of the branched regions 15b is not limited to three, and the number of the power collectors is also not limited to three.

In this way, by branching the extraction electrode 15 and forming one power collector E in each branched region 15b, even if one power collector E is open due to the electrolytic corrosion, it is possible to conduct to the electric storage element 13 by other power collector E. In other words, the electrochemical capacitor 10 does not result in the open failure as a whole. Therefore, it is possible to provide the electrochemical capacitor with higher durability and reliability.

Figure 10:
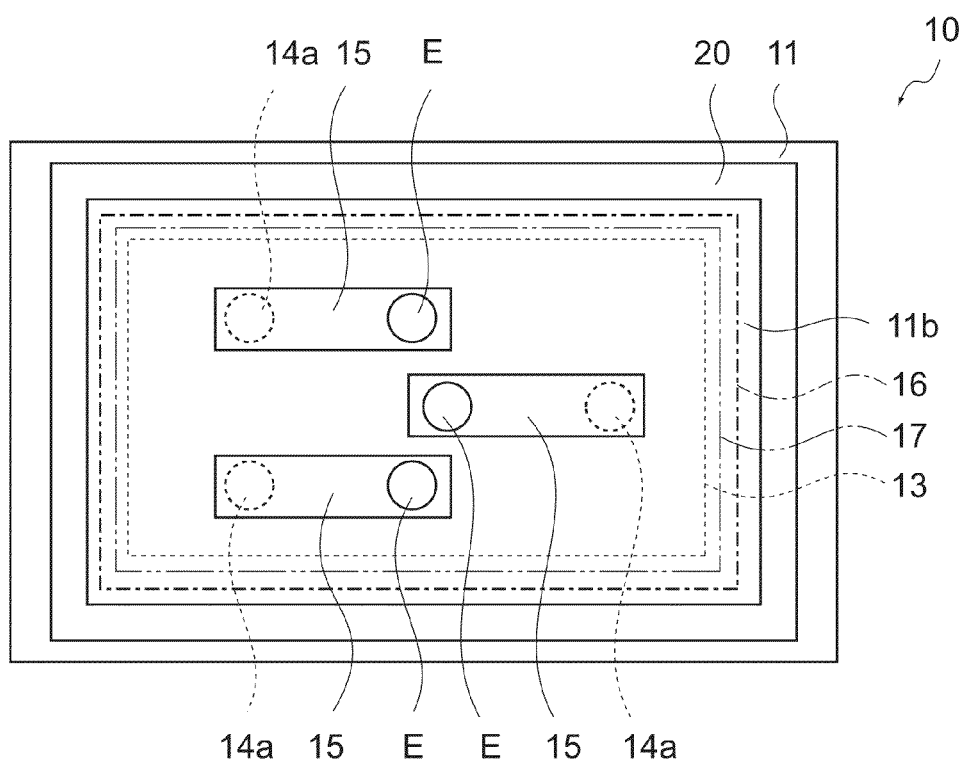
FIG. 10 is a schematic view showing a variation of the extraction electrode of the electrochemical capacitor according to the embodiment of the present disclosure.

FIG. 10 is a schematic view showing the electrochemical capacitor 10 including a plurality of the extraction electrodes 15. As shown in FIG. 10, on the electrochemical capacitor 10, a plurality of (three) via parts 14a is formed, and a plurality of (three) extraction electrodes 15 is connected to each via part 14a. Also, one power collector E is formed in each extraction electrode 15. As shown in FIG. 10, it is desirable that each power collector E be disposed at the center of the electric storage element 13 rather than the via part 14a. Furthermore, the number of the via parts 14a and the extraction electrodes 15 is not limited to three, and the number of the power collectors is also not limited to three.

In this way, by forming a plurality of the extraction electrodes 15 each connected to the via part 14a, even if the electrolytic corrosion is proceeded inside of one extraction electrode 15 and reaches the via part 14a, other extraction electrodes 15 and via parts 14a are not affected. In other words, the electrochemical capacitor 10 does not result in the open failure as a whole. Therefore, it is possible to provide the electrochemical capacitor 10 with higher durability and reliability.

Figure 11:
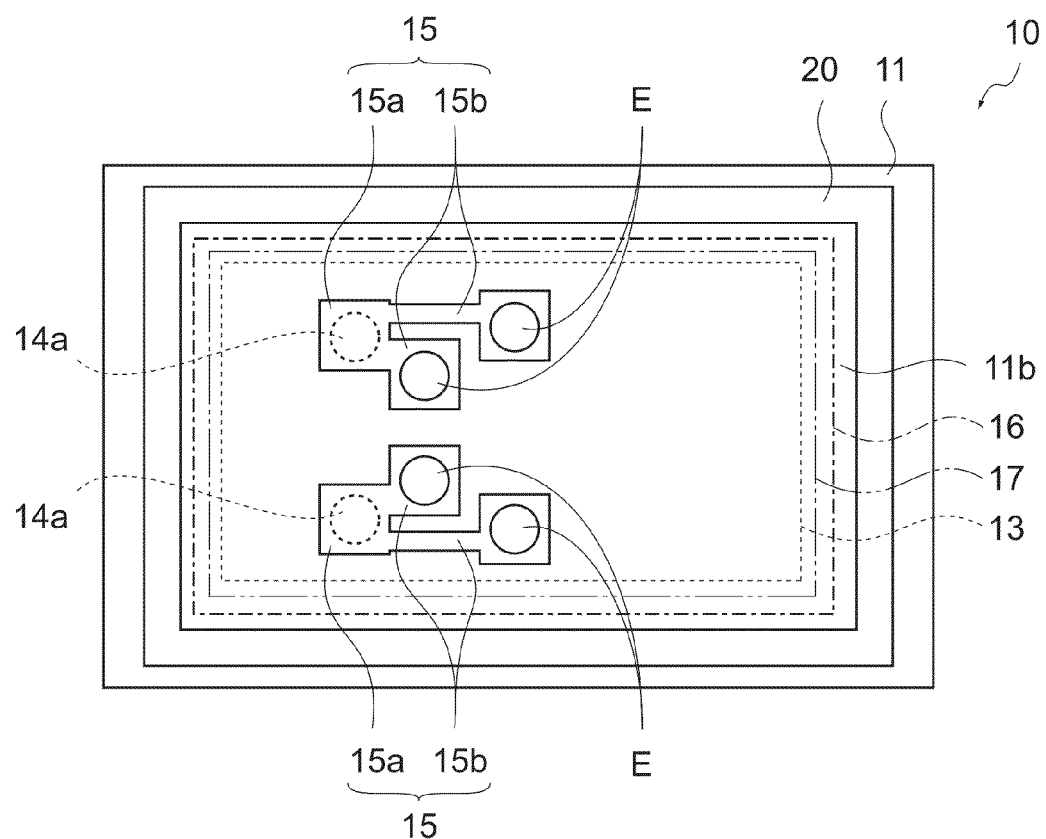
FIG. 11 is a schematic view showing a variation of the extraction electrode of the electrochemical capacitor according to the embodiment of the present disclosure.

FIG. 11 is a schematic view showing the electrochemical capacitor 10 including a plurality of extraction electrodes 15 each having a branch. As shown in FIG. 11, on the electrochemical capacitor 10, a plurality of (two) via parts 14a is formed, and a plurality of (two) extraction electrodes 15 is connected to each via part 14a. In addition, each extraction electrode 15 has a base region 15a connected to the via part 14a, and a plurality of (two) branched regions 15b that are formed and branched from the base region 15a and are apart from each other. In each branched region 15b, one power collector E is formed. As shown in FIG. 11, it is desirable that each power collector E be disposed at the center of the electric storage element 13 rather than the via part 14a.

Figure 12:
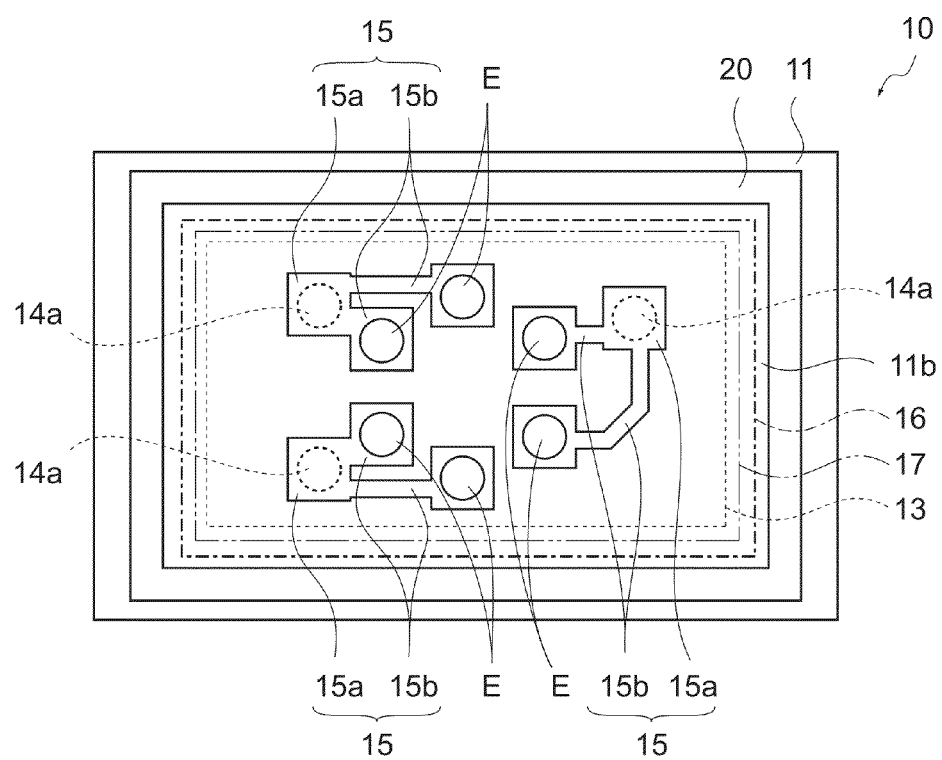
FIG. 12 is a schematic view showing a variation of the extraction electrode of the electrochemical capacitor according to the embodiment of the present disclosure.

The numbers of the via parts 14a and the extraction electrodes 15, and the number of the branched regions 15b in each extraction electrode 15 are not limited. For example, FIG. 12 shows the electrochemical capacitor 10 including three extraction electrodes 15 each having two branched regions 15b. Also, the numbers of the branched regions 15b are not necessarily the same in the respective extraction electrodes 15.

In this way, by branching a plurality of the extraction electrodes 15 each connected to the via parts 14a, and forming one power collector E in each branched region 15b, the following effects can be provided. In other words, even if one power collector E of each extraction electrode 15 is open due to the electrolytic corrosion, it is possible to conduct to the electric storage element 13 by other power collectors E. In addition, even if the electrolytic corrosion is proceeded inside of one extraction electrode 15 and reaches the via part 14a, other extraction electrodes 15 and via parts 14a are not affected. Therefore, it is possible to provide the electrochemical capacitor 10 with higher durability and reliability.

[Position of Via]

The via 11c in which the via part 14a of the positive electrode wirings 14 is disposed is formed in the case 11. It is desirable that the via 11c be formed at a center position of a rectangular case 11, on a center line of the case 11 in an X-Y direction, or a position excluding a diagonal line. This is because cracks are not easily generated based on the vias 11c even when an internal pressure of the liquid chamber 11a is increased (upon reflowing or gas generation). In addition, when a plurality of the vias 11c are formed (for example, as shown in FIGS. 10 to 12), it is desirable that the vias 11c are not arranged in the same straight line. This is because cracks are easily generated based on the vias 11c when the vias 11c are arranged in a straight line.

While the embodiments of the present disclosure are described, it should be appreciated that the invention is not limited to the above-described embodiments, and variations and modifications may be made without departing from the spirit and scope of the present disclosure.

ALTERNATIVE EMBODIMENT

In the above-described embodiments, the overcoating layer 16 is laminated on the case 11. However, when the case 11 and the overcoating layer 16 are made of the same material by the same firing process (HTCC process or LTCC process), both may be integrated.

Figure 13:
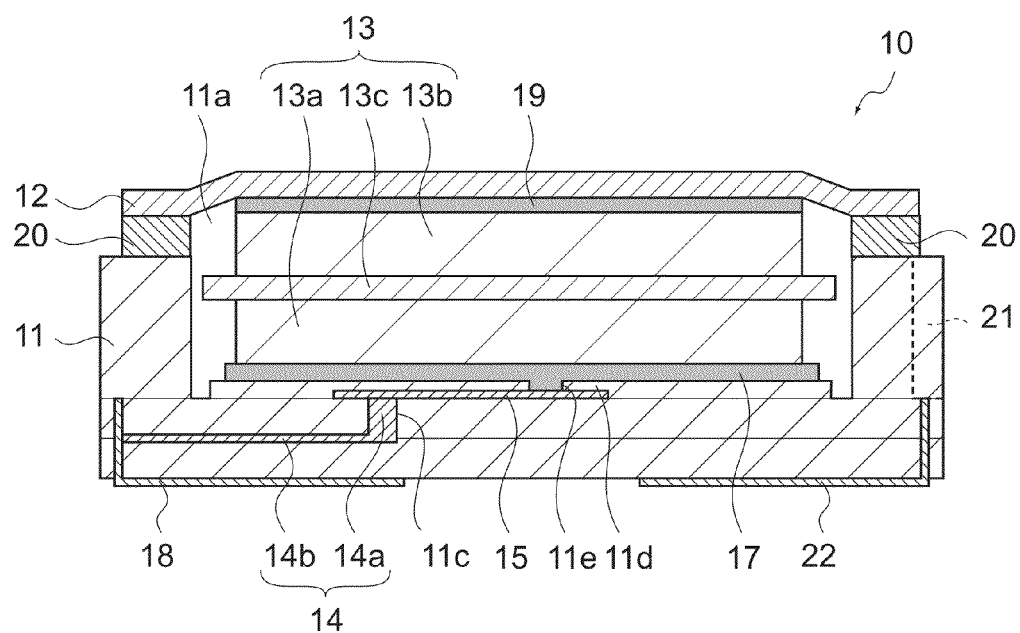
FIG. 13 is a cross-sectional view of an electrochemical capacitor according to an alternative embodiment of the present disclosure.

FIG. 13 shows an electrochemical capacitor 10 according to an alternative embodiment. In an electrochemical capacitor 10 shown in FIG. 13, a case 11 has an overcoating part 11d. The overcoating part 11d corresponds to the overcoating layer 16 in the above-described embodiments, i.e., coats the extraction electrode 15, and protects the extraction electrode 15 from electrolytic corrosion.

The overcoating part 11d has an opening 11e for exposing the partial region of the extraction electrode 15 similar to the overcoating layer 16. To the extraction electrode 15 exposed from the opening 11e, the positive electrode adhesive layer 17 is connected. In other words, by the opening 11e, the positive electrode adhesive layer 17 is electrically connected to the extraction electrode 15 to form the power collector E. The opening 11e can be disposed similar to the opening 16a of the above-described overcoating layer 16.

The overcoating part 11d is formed by integrating the overcoating layer 16 with the case 11 as described above. Thus, it is possible to form the overcoating layer 16 and the case 11 by firing them in the same firing process.

What is claimed is:

1. An electrochemical capacitor, comprising:
a lid;
a case having a via, and forming a liquid chamber together with the lid;
an electric storage element housed in the liquid chamber;
an electrolyte housed in the liquid chamber;
a wiring having a via part arranged within the via, and connecting an inside to an outside of the liquid chamber;
an extraction electrode connected to the via part;
an overcoating layer for coating the extraction electrode, and having an opening to expose a partial region of the extraction electrode in a position apart from a position where the extraction electrode is connected to the via part;
a plated layer formed on the partial region; and
a conductive adhesive layer for fixing the electric storage element to the overcoating layer, and electrically connecting the electric storage element to the extraction electrode through the opening and the plated layer.

2. The electrochemical capacitor according to claim 1, wherein
the extraction electrode has a base region connected to the via part, and a plurality of branched regions that are formed by branching from the base region and are apart from each other, and
the overcoating layer has a plurality of openings corresponding to a plurality of the branched regions.

3. The electrochemical capacitor according to claim 2, wherein
the case has a plurality of the vias,
the wiring has a plurality of via parts disposed within a plurality of the vias, and
a plurality of the extraction electrodes are connected to a plurality of the via parts and be apart from each other.

4. The electrochemical capacitor according to claim 3, wherein
the case has three or more of the vias formed such that they are not arranged on the same straight line.

5. The electrochemical capacitor according to claim 1, wherein
the overcoating layer has the opening disposed near a center of the electric storage element than the via part.

6. The electrochemical capacitor according to claim 1, wherein
the case is made of HTCC (High Temperature Co-fired Ceramics) or LTCC (Low Temperature Co-fired Ceramics), and
the overcoating layer is made of the same material as the case.

7. An electrochemical capacitor, comprising:
a lid;
a case having a via, and forming a liquid chamber together with the lid;
an electric storage element housed in the liquid chamber;
an electrolyte housed in the liquid chamber;
a wiring having a via part arranged within the via, and connecting an inside to an outside of the liquid chamber;
an extraction electrode connected to the via part;
a conductive adhesive layer; and
a plated layer,
the case having an overcoating part to coat the extraction electrode having an opening to expose a partial region of the extraction electrode in a position apart from a position where the extraction electrode is connected to the via part;
the plated layer being formed on the partial region, and
the conductive adhesive layer fixing the electric storage element to the overcoating layer, and electrically connecting the electric storage element to the extraction electrode through the opening and the plated layer.

8. The electrochemical capacitor according to claim 7, wherein
the extraction electrode has a base region connected to the via part, and a plurality of branched regions that are formed by branching from the base region and are apart from each other, and
the overcoating layer has a plurality of openings corresponding to a plurality of the branched regions.

9. The electrochemical capacitor according to claim 8, wherein
the case has a plurality of the vias,
the wiring has a plurality of via parts disposed within a plurality of the vias, and
a plurality of the extraction electrodes are connected to a plurality of the via parts and be apart from each other.

10. The electrochemical capacitor according to claim 9, wherein
the case has three or more of the vias formed such that they are not arranged on the same straight line.

11. The electrochemical capacitor according to claim 7, wherein
the overcoating layer has the opening disposed near a center of the electric storage element than the via part.

12. The electrochemical capacitor according to claim 7, wherein
the case is made of HTCC (High Temperature Co-fired Ceramics) or LTCC (Low Temperature Co-fired Ceramics), and
the overcoating layer is made of the same material as the case.

* * * * *